Jan. 15, 1952      D. GIACOSA      2,582,775
AUTOMOBILE SUSPENSION SYSTEM
Filed Aug. 3, 1948      4 Sheets-Sheet 1
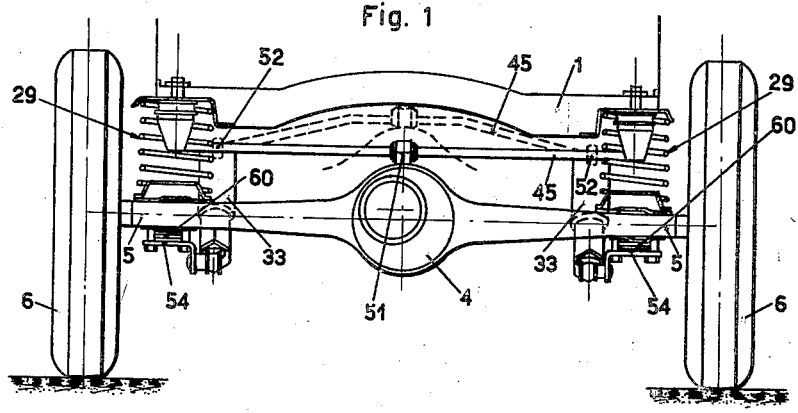
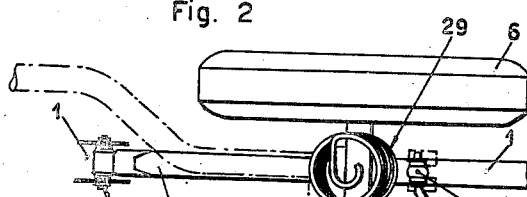
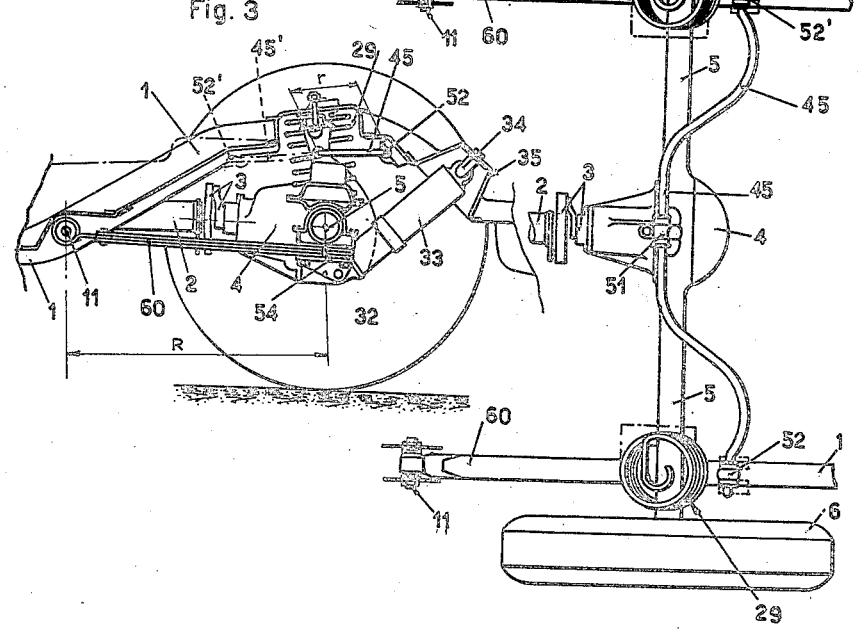
Inventor
Dante Giacosa
by Sommers & Young
Attorneys Jan. 15, 1952   D. GIACOSA   2,582,775
AUTOMOBILE SUSPENSION SYSTEM
Filed Aug. 3, 1948   4 Sheets-Sheet 2

Inventor
Dante Giacosa
by Sommers & Young
Attorneys

Jan. 15, 1952　　　D. GIACOSA　　　2,582,775
AUTOMOBILE SUSPENSION SYSTEM
Filed Aug. 3, 1948　　　　　　　　　　4 Sheets-Sheet 4
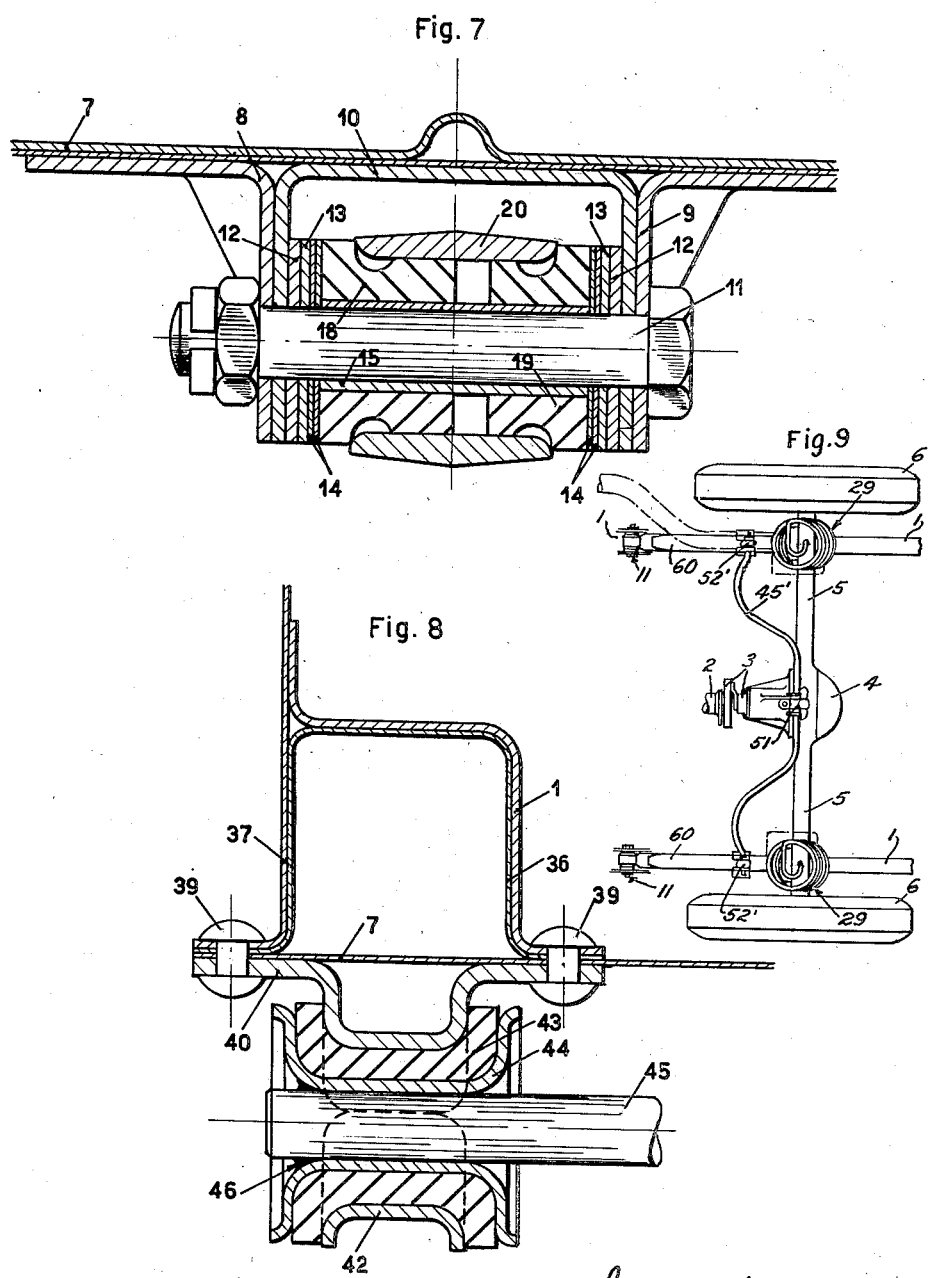
Inventor
Dante Giacosa
by Sommers & Young
Attorneys Patented Jan. 15, 1952

2,582,775

UNITED STATES PATENT OFFICE 2,582,775

AUTOMOBILE SUSPENSION SYSTEM

Dante Giacosa, Turin, Italy

Application August 3, 1948, Serial No. 42,157
In Italy August 4, 1947

8 Claims. (Cl. 267—11)

This invention relates to rear wheel suspensions for motor vehicles of the type having a rigid axle and helical springs interposed between said axle and the frame.

A first object of this invention is to provide a linkage between said axle and frame, comprising a minimum number of articulations.

A further object of this invention is to provide means for controlling the flexibility in a transverse direction of the suspension, in order to improve the stability when driving around curves when the center of gravity of the vehicle is located towards the front, as is the case in modern cars in which the rear seat is situated materially forwardly of the rear axle.

In order to attain these objects I connect the rear axle with the frame by means of longitudinal arms pivoted at one end to the frame and attached at their other end to the axle and also by means of a cross rod shaped in such manner as to form a central crank.

The two ends of said cross rod are attached to the frame while its central cranked portion is fixed to the center of the axle.

The construction is such that the radius of oscillation of the longitudinal arms is much greater than the radius of the crank of the rod. Therefore, on oscillation of the rear axle during drive resilient deformations of said cranked rod take place which are practically nil on small oscillations, but greatly increase upon increase of the width of said oscillations.

The said cranked rod therefore performs the function of varying the flexibility of the suspension making it all the more rigid as the width of the displacements of the rear axle increase, while small displacements merely result in resilient deformations of the helical springs.

The invention shall now be described with reference to the accompanying drawings, in which:

Figures 1 to 3, refer to a first embodiment of my invention.

Figure 1 is a rear front view of the suspension.
Figure 2 is a plan view thereof and
Figure 3 is a side view.

Figures 4 to 8 show a modified embodiment of my invention.

Figure 4 is a partial plan view of the suspension.

Figure 4:
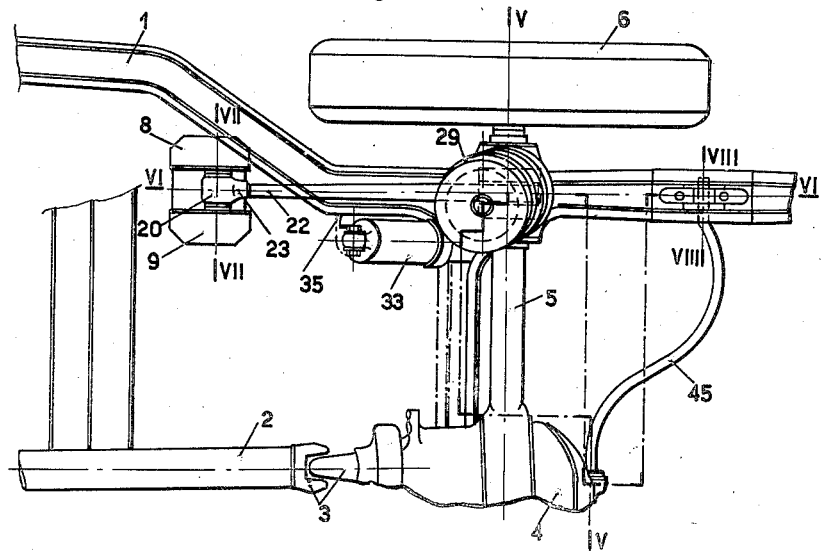
Figure 5:
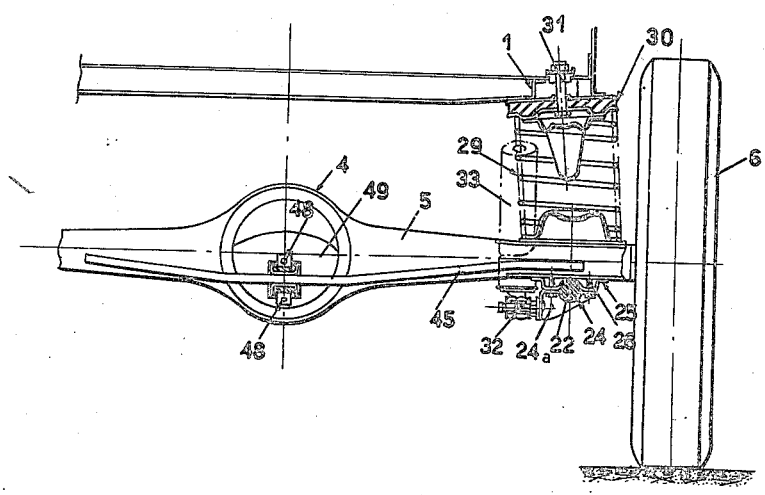
Figure 6:
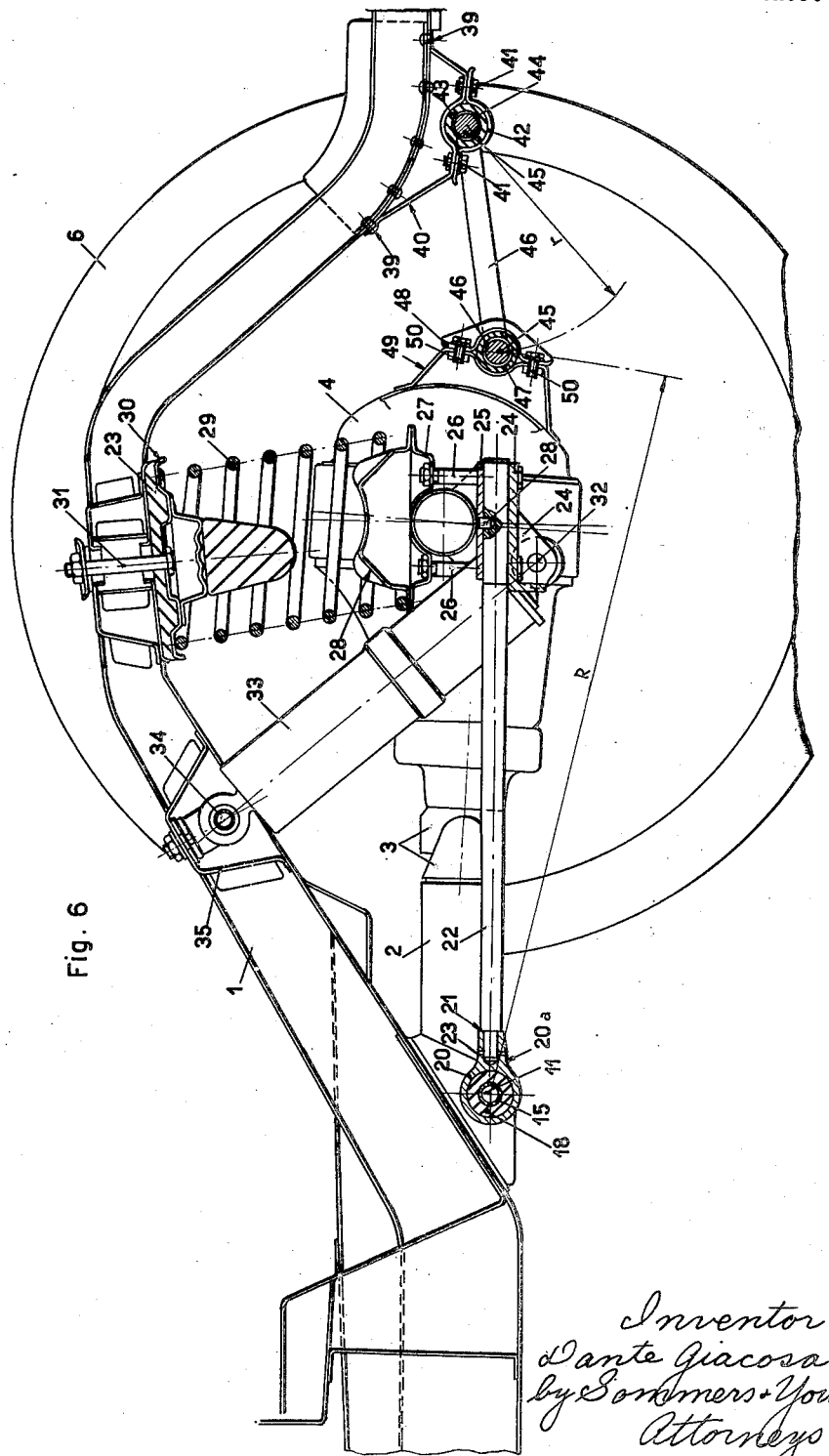

Figure 5 is a section on line V—V of Fig. 4.
Figure 6 is a section on line VI—VI of Fig. 4.
Figure 7 is a section on line VII—VII of Fig. 4.
Figure 8 is a section on line VIII—VIII of Fig. 4.

Figure 9 is a plan view of a third embodiment of the invention.

Referring to Figures 1 to 3, 1 denotes an automobile frame, 2 is the drive shaft, 3 is the cardan joint and 4 is the differential gear box, from which extend the two half-axles 5 carrying the wheels 6, the elements 4 and 5 forming a rigid unit.

60 denotes the two longitudinal arms each consisting of a leaf spring, articulated at one end to the frame 1 about a horizontal pivot 11 and secured at its other end by means of a clamping device 54 to the outer end of the associated half-axle 5.

29 denotes two helical springs interposed between the frame 1 and the end portions of the half axles. 33 denotes two hydraulic telescopic shock absorbers articulated at one end at 32 to the clamps 54 and at their other end at 34 to a cross member 35 of the frame 1.

45 denotes the cross rod fixed at its ends at 52 to the frame 1 and provided with a central cranked portion fixed at 51 to the differential gearbox 4. The said bar may also be arranged in a symmetrical position with respect to the rear axle of the vehicle, as shown in Fig. 9, so as to connect to the frame 1 ahead of the helical springs 29, instead of behind the latter.

The arms 60 are subjected to a buckling stress on transmission of the propelling force to the frame 1, and their resilient yielding eliminates the rigidity due to conventional arms; said arms also react resiliently under the action of braking and of torsional movements of the rear axle.

The rod 45 controls the transverse flexibility and inclination when driving over curves. Moreover, it serves for automatically varying the characteristics of the suspension making it harder as the width of the oscillation of the suspended parts increases. Small oscillations due to current unevenness of the road, practically leave said rod unaffected and the suspension preserves its maximum flexibility, the reaction being merely taken up by the helical springs 29.

This is due to the fact that the radius $r$ of the crank of the rod 45 is much smaller than the radius of oscillation $R$ of the arms 60. Consequently, on considerable displacements of the rear axle the rod 45 undergoes a resilient deformation proportioned to the width of said displacement, which is added to the deformation of the helical springs 29, thereby stiffening the suspension.

When the rod 45 is arranged as denoted in Figs. 1–8 of the drawing, deformations rapidly increase, while by the arrangement denoted by 45' in Fig. 9 said deformations increase less sharply.

Referring now to the embodiment shown in fuller details in Figures 4 to 8, 7 denotes the floor of the car supported by the frame 1, having attached thereto two angle plates 8, 9 between which a reinforcement C-shaped plate 10 is interposed.

11 denotes a horizontal bolt extending through the suitable holes in plate 8, 9 and 10 and secured thereto. Spacing washers 12, 13, 14 are fitted on the ends of the bolt 11 which carries centrally a bushing 15 on which are mounted two rubber bushings 18, 19. 20 denotes a cylindrical element forced on said rubber bushings and bridging the same. The said element is formed with a hollow extension 20a which accommodates the ends of the longitudinal arms 22 which, as distinct from the previously described embodiment, are round tapered rods. Said arms 22 are secured to the cylindrical member 20 by welding at 21 and by means of radial pins 23. The opposite end of the arms 22 is clamped between two curved plates 24, 25 by means of bolts 26 which extend through holes in said plates and are anchored on top to a plate 27 which is clamped by means of said bolts against the end of the associated half-axle 5. 28 denotes a pin preventing rotation of the arm 22 with respect to plates 24, 25.

The plate 27 has secured thereto a plate 28 serving as lower rest for the helical spring 29 which bears on top against a plate 30 secured by means of a bolt 31 and with the interposition of a rubber insert 23 to the frame 1.

The lower articulation pivot 32 of the shock absorber 33 is supported by a bent portion 24a of the plate 24.

Behind the helical springs 29 a plate 40 is fixed to the frame 1 underneath floor of the vehicle by means of rivets 39. A further plate 42 is bolted at 41 (Figure 6) to the plate 40. The two plates 40 and 42 clamp between them a rubber bushing 43 welded thereto and welded at its other end to a flanged metal sleeve 44 accommodating in its interior the ends of the cranked rod 45.

For attaching the central portion of said cranked rod 45 to the differential gearbox 4 I weld to the latter box a plate 49 to which I secure by means of bolts 50 a further plate 48. A rubber bushing 46 is clamped between said plates 48 and 49 and is welded externally thereto and internally to a metal flanged sleeve 46 which receives the rod 45 which is welded to said sleeve 46.

The suspension just described operates similarly to the suspension shown in Figures 1 to 3 and need not be further explained.

What I claim is:

1. In a motor vehicle having a frame, a rigid axle between the two rear wheels and helical springs between said axle and frame, connecting means between said axle and frame consisting of two longitudinal arms consisting of leaf springs articulated at one end to the frame and fixed at their other end to the axle and of a spring steel transverse cranked rod attached at its ends to the frame and at its central portion to the central axle portion, said rod being curved in order to form supplementary spring means progressively reducing the flexibility of the whole suspension system for said axle as the width of displacement of the axle increases.

2. In a motor vehicle having a frame, a rigid axle between the two rear wheels and helical springs between said axle and frame, connecting means between said axle and frame comprising longitudinal, round tapered rods articulated at one end to the frame and fixed at their other end to the axle and of a spring steel transverse cranked rod attached at its ends to the frame and at its central portion to the central axle portion, said rod being curved in order to form supplementary spring means progressively reducing the flexibility of the whole suspension system for said axle as the width of displacement of the axle increases.

3. In a motor vehicle having a frame, a rigid axle between the two rear wheels and helical springs between said axle and frame, connecting means between said axle and frame consisting of two longitudinal arms articulated at one end to the frame and fixed at their other end to the axle and of a spring steel transverse cranked rod attached at its ends to the frame rearwardly of the helical springs and at its central portion to the central portion of the axle, said rod being curved in order to form supplementary spring means progressively reducing the flexibility of the whole suspension system for said axle as the width of displacement of the axle increases.

4. In a motor vehicle having a frame, a rigid axle between the two rear wheels and helical springs between said axle and frame, connecting means between said axle and frame consisting of two longitudinal arms articulated at one end to the frame and fixed at their other end to the axle and of a spring steel transverse cranked rod attached at its ends to the frame ahead of the helical springs and at its central portion to the central portion of the axle, said rod being curved in order to form supplementary spring means progressively reducing the flexibility of the whole suspension system for said axle as the width of displacement of the axle increases.

5. In a motor vehicle having a frame, a rigid axle between the two rear wheels and helical springs between axle and frame, connecting means between said axle and frame consisting of longitudinal round tapered rods articulated at their tapered end to the frame through rubber bushings and clamped at their other end to the axle and of a spring steel transverse cranked rod attached at its ends to the frame and at its central portion to the central portion of the axle, said cranked rod being curved in order to form supplementary spring means progressively reducing the flexibility of the whole suspension system for said axle as the width of displacement of the axle increases.

6. In a motor vehicle having a frame, a rigid axle between the two rear wheels and helical springs between said axle and frame, connecting means between said axle and frame consisting of two longitudinal arms articulated at one end to the frame and fixed at their other end to the axle and of a spring steel transverse cranked rod attached at its ends to the frame and at its central portion to the central portion of the axle, said rod being curved in order to form supplementary spring means progressively reducing the flexibility of the whole suspension system for said axle as the width of displacement of the axle increases, the attachment of said cranked rod to the frame and central portion of the axle being effected by welding the ends and central portion of said cranked rod to metal bushings encircled by rubber bushings clamped between pairs of bolted plates, one plate of the central pair being fixed to the central portion of the axle and one plate of each end pair being fixed to the frame.

7. In a motor vehicle having a frame, a rigid axle between two rear wheels and helical springs between said axle and frame, connecting means between said axle and said frame consisting of two longitudinal arms articulated at one end to the frame and fixed at their other ends to the axle, and of a spring steel transverse cranked rod attached at its ends to the frame and at its central portion to the central axle portion, said rod being curved in order to form supplementary spring means progressively reducing the flexibility of the whole suspension system for said axle as the width of displacement of the axle increases.

8. In a motor vehicle having a frame, a rigid axle between two rear wheels and helical springs between said axle and frame, connecting means between said axle and said frame consisting of two longitudinal arms articulated at one end to the frame and fixed at their other ends to the axle, and of a spring steel transverse cranked rod attached at its ends to the frame and at its central portion to the central axle portion, said rod being curved in order to form supplementary spring means progressively reducing the flexibility of the whole suspension system for said axle as the width of displacement of the axle increases, the radius of oscillation of said longitudinal arms being materially greater than the crank radius of the cranked rod.

DANTE GIACOSA.

REFERENCES CITED

The following references are of record in the file of this patent:

UNITED STATES PATENTS

| Number | Name | Date |
|---|---|---|
| 1,544,708 | Wells | July 7, 1925 |
| 2,179,016 | Leighton | Nov. 7, 1939 |
| 2,236,410 | Leighton | Mar. 25, 1941 |
| 2,300,844 | Olley | Nov. 3, 1942 |
| 2,345,448 | Best | Mar. 28, 1944 |
| 2,427,927 | Shutte | Sept. 23, 1947 |

FOREIGN PATENTS

| Number | Country | Date |
|---|---|---|
| 571,423 | France | Feb. 1, 1924 |